United States Patent
Karray et al.

(10) Patent No.: US 6,796,581 B2
(45) Date of Patent: Sep. 28, 2004

(54) VARIABLE INFLATION FORCE AIRBAG INFLATOR

(75) Inventors: Fakhri Karray, Waterloo (CA); Otman Basir, Kitchener (CA); Dmitri Axakov, Kitchener (CA); Viktor Haramina, Kitchener (CA)

(73) Assignee: Intelligent Mechantronic Systems, Inc. (CA)

( * ) Notice: Subject to any disclaimer, the term of this patent is extended or adjusted under 35 U.S.C. 154(b) by 0 days.

(21) Appl. No.: 10/192,236

(22) Filed: Jul. 10, 2002

(65) Prior Publication Data

US 2003/0184067 A1 Oct. 2, 2003

Related U.S. Application Data

(60) Provisional application No. 60/367,644, filed on Mar. 26, 2002.

(51) Int. Cl.[7] ............................................... B60R 21/26
(52) U.S. Cl. ....................................... 280/741; 422/165
(58) Field of Search ............................... 422/165, 166; 280/741; 102/530, 531, 469

(56) References Cited

U.S. PATENT DOCUMENTS

| | | | |
|---|---|---|---|
| 3,724,870 A | * | 4/1973 | Kurokawa et al. .......... 280/741 |
| 4,136,894 A | | 1/1979 | Ono et al. |
| 4,919,897 A | * | 4/1990 | Bender et al. ............... 422/165 |
| 5,320,382 A | * | 6/1994 | Goldstein et al. ........... 280/735 |
| 5,460,405 A | * | 10/1995 | Faigle et al. ................. 280/735 |
| 5,839,754 A | | 11/1998 | Schluter et al. |
| 6,095,558 A | | 8/2000 | Bayer et al. |
| 6,095,560 A | | 8/2000 | Perotto |
| 6,308,983 B1 | | 10/2001 | Sinnhuber |
| 6,491,321 B1 | * | 12/2002 | Nakashima et al. ........ 280/736 |

\* cited by examiner

*Primary Examiner*—Kimberly S. Smith
(74) *Attorney, Agent, or Firm*—Carlson, Gaskey & Olds

(57) ABSTRACT

An inflator for an airbag includes a container defining and outer surface and an inner compartment. A plurality of igniters are disposed within the inner compartment and are operably associated with a gas-generating unit. Each gas-generating unit is formed by a pair of matched stamped housings. Bushing separate and secure the gas-generating units in place along the outer surface of the container. Each gas-generating unit defines an annular chamber filled with gas generating material. Each of the igniters within the container are independently ignitable and are mechanically isolated from each other to prevent actuation of one igniter in response to the actuation of an adjacent igniter. The igniters are independently actuated to control the magnitude of inflation force of the airbag.

25 Claims, 3 Drawing Sheets

VARIABLE INFLATION FORCE AIRBAG INFLATOR

RELATED APPLICATIONS

This application claims priority to U.S. Provisional Application Serial No. 60/367,644; filed on Mar. 26, 2002.

BACKGROUND OF THE INVENTION

This invention relates to an airbag assembly for a motor vehicle and specifically to a variable inflation force inflator for an airbag assembly.

Typically, an airbag assembly includes an airbag cushion and an inflator. Conventional inflator assemblies include a detonator to trigger a gas-producing chemical. Triggering the gas-producing chemical produces a large quantity of rapidly expanding gas that inflates the airbag cushion. The inflator is typically triggered electrically by way of an electronic control module positioned within a motor vehicle. The rapidly expanding gas that inflates the airbag cushion exerts a large force in a relatively short duration of time. This large force is a product of the speed in which an airbag must fully inflate in order to provide impact prevention to occupants of the vehicle during a collision.

The force of inflation is set at a level such that an occupant of normal size and weight will not be injured. The required force to inflate an airbag cushion varies depending on the specific size and weight of the occupant. Injury to occupants is a design consideration taken into account when determining the magnitude of airbag inflation force.

Warnings, along with devices that simply turn the air bag off upon sensing specific conditions are currently in use to warn and protect against possible injury. In some instances a simply switch is installed to turn off the airbag. Other devices sense the size or weight of the occupant and activate the airbag only under a predefined set of conditions. It is well proven that airbag cushions provide an additional level of safety to an occupant during a collision. Devices that disable the airbag remove this level of safety to the possible detriment of smaller occupants.

For this reason, it is desirable to develop an airbag assembly that can inflate at various force levels such that the safety benefits of an airbag cushion can be used for occupants of all sizes.

SUMMARY OF THE INVENTION

An embodiment of this invention is an inflator for an airbag assembly including a plurality of independently actuatable gas generating units to vary inflation force of an airbag cushion.

An embodiment of this invention includes a plurality of gas generating units mounted to an igniter holder. Each gas-generating unit includes an outer periphery including a plurality of gas output openings. The igniter holder is generally a cylinder defining an outer surface and an inner cavity. Igniters are disposed within the inner cavity at discrete locations along an axis. Each of the igniters are electrically connected to a control unit by way of electrical leads. The igniters are mechanically isolated from each other to prevent actuation of one igniter in response to the actuation of an adjacent igniter.

In one embodiment, the igniters are isolated by a hard-enable compound packed into the igniter holder. Alternatively, interior walls are disposed within the cavity and between the igniters to separate the igniters and prevent actuation of one igniter from setting off an adjoining igniter.

Each gas-generating unit is formed from a first and second stamped metal housing. The first and second stamped housings include overlapping tab sections at the contact point therebetween. The overlapping tab sections seal a compartment formed between the first and second metal housings. The tab sections are not mechanically attached to each other. Instead, the housings are forced into contact and remain in contact by way of pressure applied from a securing member attached to the end of the igniter holder.

The compartment formed between the first and second metal housings includes the pyrotechnic compound and a gas filter. The compartment includes an angle alpha between the first and second metal housings, such that the width decreases as the perpendicular distance from the axis increases so that gas generated by the pyrotechnic compound will be forced through the gas filter. To minimize heat from one gas-generating unit from igniting an adjacent gas-generating unit a thermal screen is disposed between each gas-generating unit.

The inflator of this invention preferably includes three gas-generating units of differing size and power. The power correlates to the amount of pyrotechnic material disposed in each compartment. A controller is used to selectively ignite each gas-generating unit based on various parameters sensed within the motor vehicle The inflator assembly of this invention includes multiple gas-generating units or chambers including an individually actuated igniter that allows control over inflation of the airbag cushion to vary the magnitude of force exerted by the airbag cushion during inflation.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
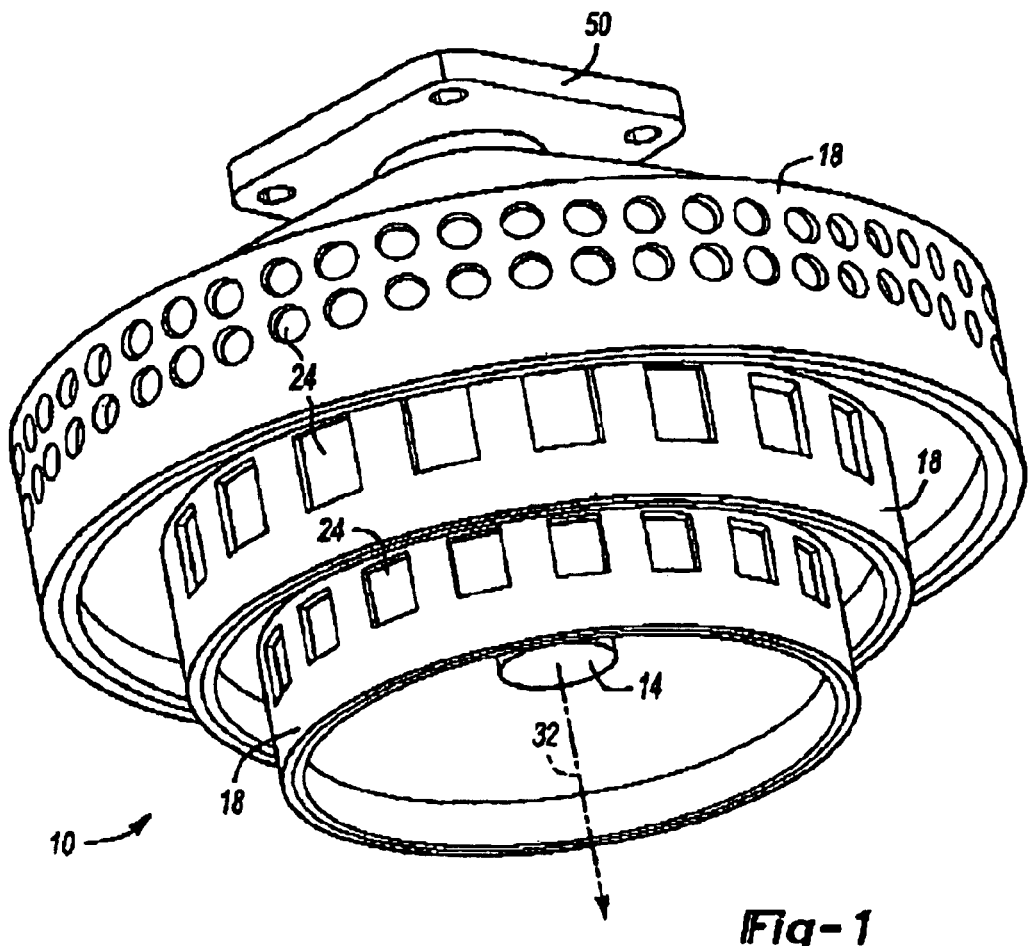
FIG. 1 is a perspective view of an inflator for an airbag.

Referring to the Figures, wherein like numerals indicate like or corresponding parts throughout the several views, an inflator for an airbag assembly is generally indicated at 10 in FIG. 1. The inflator 10 includes a plurality of gas generating units 18 mounted to an igniter holder 14. Preferably, the gas generating units 18 are disposed annularly about an axis 32. Each of the gas generating units 18 includes an outer periphery including a plurality of gas output openings 24. Although preferably each gas generating unit 18 extends about the entire circumference of the igniter holder 14, it is within the contemplation of this invention that the gas generating units extend about only a portion of the igniter holder 14. The inflation 10 includes a mounting flange 50 to facilitate mounting within a vehicle.

Figure 2:
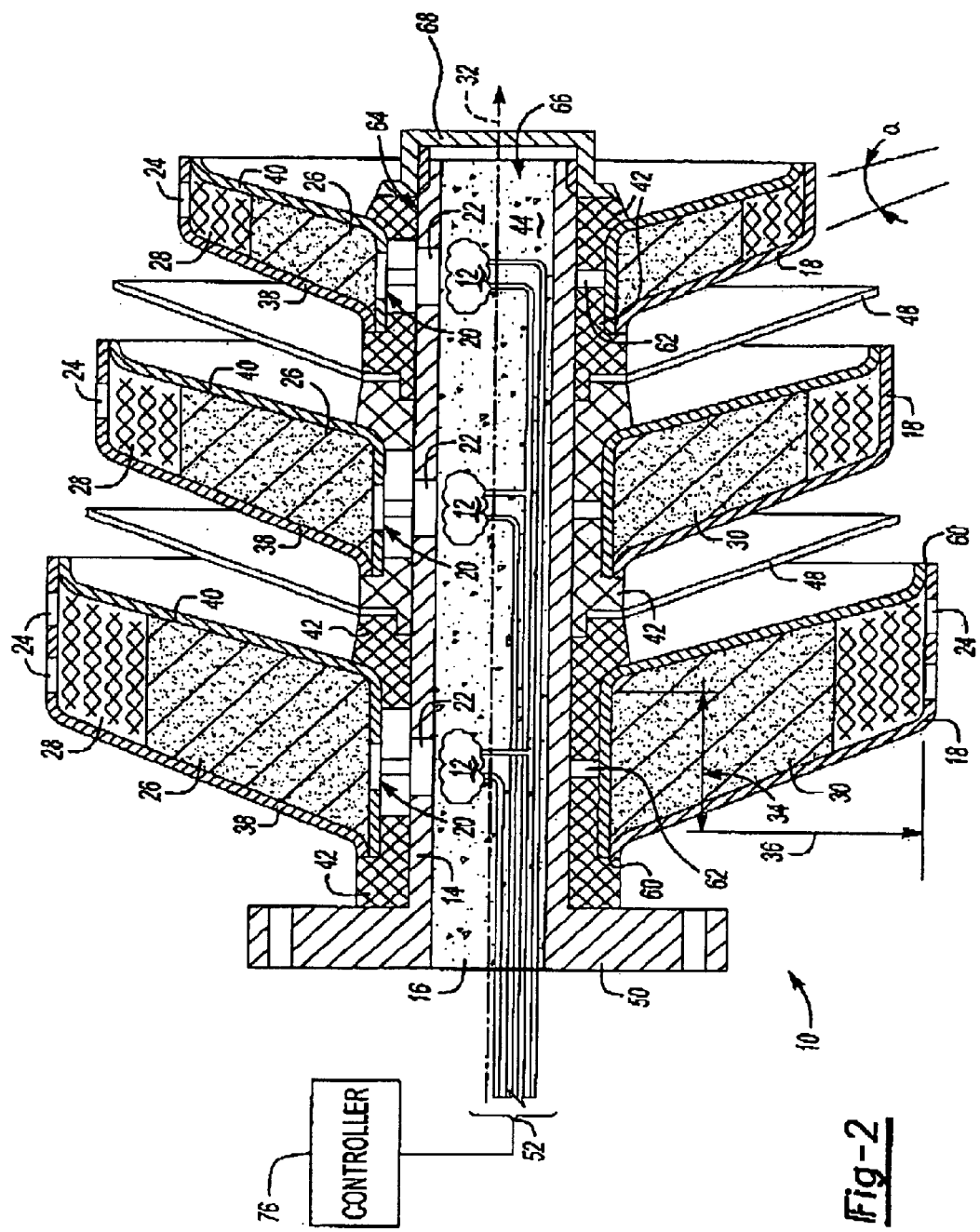
FIG. 2 is a cross sectional view of one embodiment of the inflator.

Referring to FIG. 2, the inflator 10 is shown in cross section. The igniter holder 14 is generally a cylinder defining an outer surface 64 and an igniter compartment 16 that includes an inner cavity 66. Igniters 12 are disposed within the inner cavity 66 at discrete locations along the axis 32. Each of the igniters 12 are electrically connected to a control unit 76 by way of electrical leads 52. The igniters 12 are mechanically isolated from each other to prevent actuation of one igniter 12 in response to the acutation of an adjacent igniter 12. Preferably, the igniters 12 are isolated mechanically by way of self-hardening compound 44 within the cavity 66 of the igniter holder 14.

Figure 3:
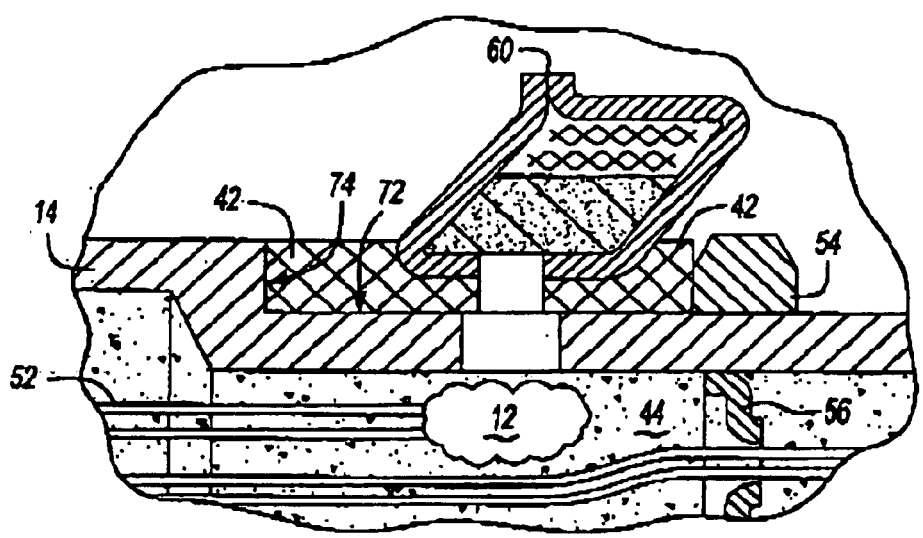
FIG. 3 is a cross sectional view of another embodiment of the inflator.

Referring to FIG. 3, an alternate method of mechanically isolating the igniters 12 includes a plurality of inner walls 56 disposed between adjacent igniters 12. Each of the inner walls 56 includes an opening for the electrical leads 52. As appreciated, the use of the inner walls 56 can be used in combination with the use of the self-hardening compound 44. Further, the inner walls 56 provide additional reinforcement of the igniter holder 14.

The gas generating units 18 are held to the igniter holder 14 between a shoulder 74 and a bushing 54.

Figure 4:
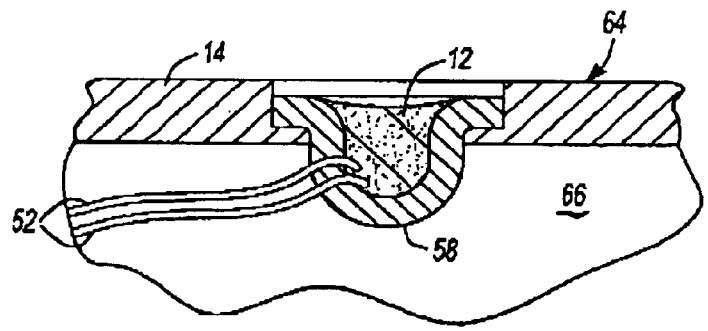
FIG. 4, is a cross sectional view of one embodiment of mounting an igniter

Referring to FIG. 4, another alternate method of isolating the igniters 12 is shown and includes a housing 58. Each of the igniters 12 are built into the housing 58 and embedded into the igniter holder 14 at an igniter opening 22. The housing 58 can be mounted by any means known by one skilled in the art to the igniter holder 14. Installation of the igniter housings 58 allows for replacement of a specific igniter independent of other igniters contained with the igniter holder 14.

Referring to FIG. 2, the gas generating units 18 are secured to the outer surface of the igniter holder 14 by sealing bushings 42. The sealing bushings 42 provide for the assembly and construction of each of the gas generating units 18 without the use of any type of heat generating securing means such as spot welding or the like beside the pyrotechnical material 26. It is desirable to minimize the use of heat producing assembly processes to prevent unwanted ignition of the pyrotechnic material 26. Each of the gas generating units 18 includes a quantity of pyrotechnic material 26 that generates the explosive gas to immediately inflate the airbag. Each sealing bushing 42 includes an opening 62 corresponding to one of the igniter openings 22 and first opening 20.

The gas generating units 18 include first and second stamped metal housings 38,40. Each stamped housing 38,40 includes a length 36 and a width 34. The width 34 of each metal housing 38,40 is positioned generally parallel to the axis 32 and the length 36 is generally positioned transverse to the axis 32. The first and second metal housings 38,40 include overlapping tab sections 60 at a contact point therebetween. The overlapping tab sections 60 provide a seal to prevent gas from discharging between the first and second housings 38,40. Note that the tab sections 60 may or may not be mechanically attached to each other, the contact point between the first and second metal housings 38,40 are held together by the sealing bushings 42, if bushing of sufficient strength are used.

A fastening member 68 secures the metal housings 38,40 and the sealing bushings 42 to the outer surface 64 of the igniter holder 14. Preferably, each of the sealing bushings 42 slides onto the outer surface 64 of the igniter holder 14 and are secured by a fastening member 68. Preferably, the fastening member includes threads that engage a threaded portion of the igniter holder 14. Alternatively, each sealing bushing 42 may include threads that engage threads disposed on the outer surface of the igniter holder 14. It is within the contemplation of this invention to use any type and amount of fastening member as known to one skilled in the art.

Figure 5A:
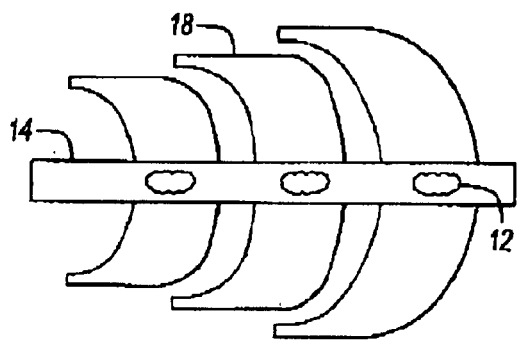
FIG. 5A is a schematic view of one configuration of the gas generating units.
Figure 5B:
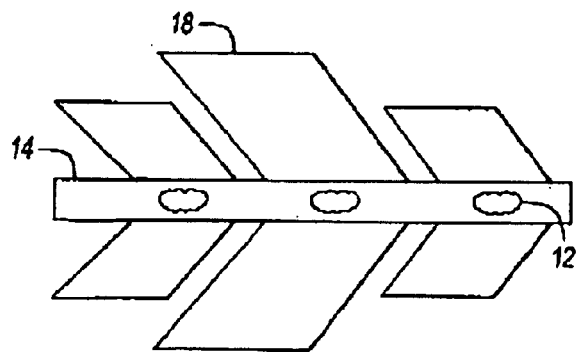
FIG. 5B is a schematic view of another configuration of the gas generating units.
Figure 5C:
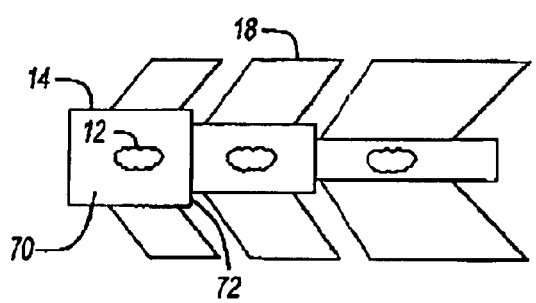
FIG. 5C is a schematic view of another configuration of the gas generating units.

Referring to FIG. 5C, another embodiment of the gas generator 18 is shown including an igniter 70 with a stepped outer surface 72. The stepped outer surface 72 provides an alternate means of securing of the metal housing sections 38,40 to the igniter holder 70 (See FIG. 3). In this embodiment, the metal housing sections 38,40 are constrained between a shoulder 74 and an adjacent gas-generating unit 18. One gas generating unit abuts the shoulder, a second gas generating unit abuts the second shoulder and the first generating unit, and subsequent gas generating unit would abut the adjacent gas generating unit and finally be secured by a securing member that fastens to the igniter holder.

Referring to FIG. 2, a compartment 30 formed between the first and second metal housings includes the pyrotechnic compound 26 and a gas filter 28. The compartment 30 is annularly shaped about the axis 32. Preferably, the compartment 30 includes an angle alpha between the first and second metal housings 38,40 such that the width 34 decreases as the perpendicular distance from the axis 32 increases. Configuring the compartment of the gas generator 18 in this manner ensures that gas generated by the pyrotechnic material 26 will be forced through the gas filter 28. As gas is generated and pushes outward toward the gas output openings 24, the gas filter 28 is compressed to prevent gas from blowing by the gas filter 28.

To minimize heat from one gas-generating unit 18 from igniting an adjacent gas-generating unit 18 a thermal screen 48 is disposed between each gas-generating unit 18. Preferably, each thermal screen 48 is disk shaped and formed from a material capable of shielding enough heat emitted from one gas-generating unit 18 such that an adjacent heat generating unit 18 is not ignited.

The gas generating units 18 shown in FIG. 2 are hyperbolic shapes rotated about the axis 32. Referring to FIGS. 5A-C, other generally hyperbolic shapes are schematically shown. FIG. 5A illustrates an alternate shape for the gas-generating units including a modified hyperbolic shape having a curved surface.

FIG. 5B illustrates another embodiment of the gas-generating unit 18 of a different configuration. In this configuration, gas-generating units 18 of differing size are arranged to control inflation of the airbag. The size of each gas-generating unit 18 correlates to the inflation force derived from gas expelled through the gas output openings 24. The largest and most powerful gas-generating unit 18 is positioned between two gas-generating units 18 of lesser size and power. Placement of gas-generating units 18 of a specific power level allow for control of the inflation force of the air bag. It should be understood that it is within the contemplation of this invention to use any shape known to one skilled in the art for the gas generating units 18.

Referring to FIG. 2, the inflator of this invention preferably includes three gas-generating units 18 of differing size and power. The power correlates to the amount of pyrotechnic material disposed in each compartment. Preferably, the relationship between each of the gas-generating units 18 is 1:2:4. This combination provides eight possible levels of power to deploy an airbag cushion. As appreciated, any combination of relationship between gas-generating units 18 as would be known to a worker skilled in the art.

The controller 76 is used to selectively ignite each gas-generating unit 18 based on various parameters sensed within the motor vehicle. Some of the parameters may include occupant weight, position and severity of collision. The controller 76 tailors actuation of the igniters 12 and thereby deployment of the airbag cushion to specific vehicle and occupant conditions in order to optimize protection obtained from the airbag. Further, it is possible to sequentially activate the gas generating units 18 to provide sequential ramping up of air bag inflation force to compensate for specific vehicle and occupant characteristics. It is within the contemplation of this invention to use gas-generating units 18 of various power and combinations as required to optimize airbag inflation depending on specific vehicle conditions.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. An airbag igniter assembly comprising;
   a container defining an inner chamber containing a plurality of igniters spaced apart along a longitudinal axis; and
   a plurality of gas generating units supported on an outer surface of said container and spaced apart from one another along said longitudinal axis and in communication with at least one of said igniters.

2. The assembly as recited in claim 1, wherein each of said gas generating units extends circumferentially about said outer surface of said container.

3. An airbag assembly comprising:
   a cylindrical container disposed longitudinally about an axis, said container comprising an outer surface and an inner chamber;
   a plurality of gas generating units attachable to said container, said gas generating units surrounding said container and disposed at discrete intervals along said axis; and
   a plurality of igniters disposed within said chamber, wherein each of said igniters are separately actuatable relative to each of the other igniters.

4. The assembly as recited in claim 3, wherein each of said gas generating units comprise a two piece metal housing defining an interior space for gas generating material.

5. The assembly as recited in claim 4, comprising a hardenable material disposed within said container and separating each of said plurality of igniters each of the other igniters.

6. An airbag assembly comprising;
   a container defining an inner chamber and an outer surface having a plurality of igniter openings;
   a plurality of independently actuatable igniters disposed within said inner chamber; and
   a plurality of gas generating units supported about said container and spaced axially apart from each other, said gas generating units containing a gas-producing material associated with at least one of said igniters, wherein said plurality of igniters are substantially isolated from each other such that actuation of one of said plurality of igniters docs not cause actuation of any other of said plurality of igniters.

7. The assembly of claim 6, wherein said plurality of gas generating units are mounted to said outer surface of said container and include an inlet in communication with at least one of said plurality of igniter openings and a plurality of gas output openings on an end distal from said inlets.

8. The assembly of claim 7, wherein said gas generating units define an annular compartment including a gas filter covering said gas output openings.

9. The assembly of claim 8, wherein said annular compartment of said gas generating unit is disposed about said axis centered within said container and includes a width generally transverse to said axis of rotation and a length generally perpendicular to said axis, said width decreasing with increasing perpendicular distance from said axis of rotation.

10. The assembly of claim 6, wherein said igniters are mechanically isolated by inner walls disposed within said container to prevent actuation of one igniter in response to actuation of an adjacent igniter.

11. The assembly of claim 6, wherein each of said igniters is disposed within an igniter housing mounted within said container.

12. The assembly of claim 6, wherein each of said gas generating units includes a specific gas generating ability relative to the other gas generating units according to a predetermined relationship.

13. The assembly of claim 12, wherein said igniter housing is replaceably mounted within said container.

14. The assembly of claim 6, wherein said igniter includes at least one flange portion for mounting within a motor vehicle.

15. An airbag assembly comprising:
   a container defining an inner chamber and an outer surface having a plurality of igniter openings;
   a plurality of independently actuated igniters disposed within said inner chamber, said plurality of igniters are substantially isolated from each other such that actuation of one of said plurality of igniters does not cause actuation of any other of said plurality of igniter; and
   a plurality of gas generating units supported about said container and containing a gas-producing material associated with at least one of said igniters, wherein said gas generating units are secured in place along said container by a plurality of bushings disposed therebetween.

16. The assembly of claim 15, wherein said bushings and said gas generating units are trapped in position along said container between a flange on one end of the container and a fastener secured to a second end.

17. The assembly of claim 15, wherein said container includes a plurality of diameters defining a plurality of shoulders and each of said gas generating units trapped between one of said shoulders and a fastener installed on an opposite side of said gas generating unit.

18. The assembly of claim 17, wherein each of said gas generating units comprises a metal housing, wherein each of said metal housing includes a first portion transverse to said axis, and a second portion substantially parallel to said axis.

19. An airbag assembly comprising:
- a container defining an inner chamber and an outer surface having a plurality of igniter openings;
- a plurality of independently actuated igniters disposed within said inner chamber, said plurality of igniters are substantially isolated from each other such that actuation of one of said plurality of igniters does not cause actuation of any other of said plurality of igniters; and
- a plurality of separable gas generating units supported about said container and containing a gas-producing material associated with at least one of said igniters wherein each of said gas generating units includes first and second metal housings placed adjacent to each other.

20. The assembly of claim 19, wherein said inlets are formed by corresponding notches defined by each of said first and second metal housings.

21. An airbag assembly comprising:
- a container defining an inner chamber and an outer surface having a plurality of igniter openings;
- a plurality of independently actuated igniters disposed within said inner chamber; wherein said igniters me mechanically isolated by a self hardening compound filling said interval between igniters within said container, such that one of said igniters is not actuated by actuation of an adjacent igniter; and
- a plurality of separable gas generating units supported about said container and containing a gas-producing material associated with at least one of said igniters, wherein said plurality of igniters are substantially isolated from each other such that actuation of one of said plurality of igniters does not cause actuation of any other of said plurality of igniters.

22. An airbag assembly comprising:
- a container defining an inner chamber and an outer surface having a plurality igniter openings;
- a plurality of independently actuated igniters disposed within said inner chamber;
- a plurality of separable gas generating units supported about said container and containing a gas-producing material associated with at least one of said igniters, wherein said plurality of igniters are substantially isolated from each other such that actuation of one of said plurality of igniters does not cause actuation of any other of said plurality of igniters; and
- a thermal screen disposed about said outer surface of said container and between said gas generating units to prevent ignition of said gas producing material by heat generated from an adjacent gas generating unit.

23. An airbag assembly comprising:
- a container defining an inner chamber and an outer surface having a plurality of igniter openings;
- a plurality of independently actuated igniters disposed within said inner chamber, said plurality of igniters are substantially isolated from each other such that actuation of one of said plurality of igniters does not cause actuation of any other of said plurality of igniters; and
- a plurality of separable gas generating units supported about said container and containing a gas-producing material associated with at least one of said igniters, wherein each of said gas generating units includes a specific gas generating ability relative to the other gas generating units according to a predetermined relationship, wherein there are three gas generating units and said predetermined relationship is 1:2:4.

24. An airbag assembly comprising:
- a container defining an inner chamber and an outer surface having a plurality of igniter openings;
- a plurality of independently actuated igniters disposed within said inner chamber, said plurality of igniters are substantially isolated from each other such that actuation of one of said plurality of igniters does not cause actuation of any other of said plurality of igniters; and
- a plurality of separable gas generating units supported about said container and containing a gas-producing material associated with at least one of said igniters, wherein said each of said gas generating units forms a generally parabolic shape about said an axis.

25. An airbag assembly comprising:
- a container defining an inner chamber and an outer surface having a plurality of igniter openings;
- a plurality of independently actuated igniters disposed within said inner chamber, said plurality of igniters are substantially isolated from each other such that actuation of one of said plurality of igniters does not cause actuation of any other of said plurality of igniters; and
- a plurality of separable gas generating units supported about said container and containing a gas-producing material associated with at least one of said igniters, wherein each of said gas generating units forms a generally hyperbolic shape about an axis of.

* * * * *

UNITED STATES PATENT AND TRADEMARK OFFICE
CERTIFICATE OF CORRECTION

PATENT NO. : 6,796,581 B2
APPLICATION NO. : 10/192236
DATED : September 28, 2004
INVENTOR(S) : Karray et al.

It is certified that error appears in the above-identified patent and that said Letters Patent is hereby corrected as shown below:

ON THE TITLE PAGE:
Assignee's name should read as follows:

Item (73) Assignee: --Intelligent Mechatronic Systems, Inc. (CA)--

IN THE CLAIMS:
Claim 6, Column 6, line 7: "docs" should be --does--

Claim 15, Column 6, line 49: Insert --separable-- after "of" and before "gas"

Claim 18, Column 6, line 66: "housing" should be --housings--

Claim 21, Column 7, line 23: "me" should be --are--

Claim 24, Column 8, line 34: delete "said"

Signed and Sealed this

Seventh Day of August, 2007

JON W. DUDAS
*Director of the United States Patent and Trademark Office*